US010328736B2

(12) United States Patent
Riedl et al.

(10) Patent No.: US 10,328,736 B2
(45) Date of Patent: Jun. 25, 2019

(54) HIGHLY FLEXIBLE FOIL COMPOSITE MATERIAL AND ITS USE IN CARD BODIES

(71) Applicant: GIESECKE & DEVRIENT GMBH, Munich (DE)

(72) Inventors: Josef Riedl, Attenkirchen (DE); Andreas Braun, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 963 days.

(21) Appl. No.: 14/172,551

(22) Filed: Feb. 4, 2014

(65) Prior Publication Data

US 2014/0151923 A1   Jun. 5, 2014

Related U.S. Application Data

(62) Division of application No. 13/579,449, filed as application No. PCT/EP2011/000881 on Feb. 23, 2011.

(30) Foreign Application Priority Data

Feb. 25, 2010   (DE) .................. 10 2010 009 230

(51) Int. Cl.
  *B29D 7/01*   (2006.01)
  *B42D 25/305*   (2014.01)
  (Continued)

(52) U.S. Cl.
  CPC ............ *B42D 25/305* (2014.10); *B29C 48/08* (2019.02); *B29C 48/21* (2019.02); *B29C 48/30* (2019.02);
  (Continued)

(58) Field of Classification Search
  CPC .................................................. B42D 25/305
  See application file for complete search history.

(56) References Cited

U.S. PATENT DOCUMENTS 4,410,595 A    10/1983   Matsumoto et al.
5,010,139 A *   4/1991   Yu .......................... C08G 65/04
                                                              524/397
(Continued)

FOREIGN PATENT DOCUMENTS

CA    2 728 468 A1    12/2009
CN    102666066 A     9/2012
(Continued)

OTHER PUBLICATIONS (Polyterpene resins thermoplastic book)—Harper et al, Plastics Materials and Processes: A Concise Encyclopedia, 2003 (google books); polyterpene resins are thermoplastic polymers [p. 448, 2nd paragraph].*
(Continued)

*Primary Examiner* — Matthew J Daniels
*Assistant Examiner* — Kimberly A. Stewart
(74) *Attorney, Agent, or Firm* — Workman Nydegger

(57) ABSTRACT

A foil composite material usable as a layer in a card body of a portable data carrier, that includes one outer plastic layer, one inner plastic layer and one second outer plastic layer. All the layers jointly form a coextruded composite, and the plastic of one outer layer is a thermoplastic polymer or a mixture thereof. The plastic of the one inner layer is a mixture of at least one thermoplastic elastomer and at least one thermoplastic polymer. The plastic of the second outer layer is a thermoplastic polymer or a mixture thereof.

15 Claims, 2 Drawing Sheets

(51) Int. Cl.

| | | |
|---|---|---|
| *B42D 25/45* | (2014.01) | |
| *B32B 7/02* | (2019.01) | |
| *B32B 27/08* | (2006.01) | |
| *B32B 27/36* | (2006.01) | |
| *B32B 27/40* | (2006.01) | |
| *B42D 25/00* | (2014.01) | |
| *B32B 7/10* | (2006.01) | |
| *B32B 27/18* | (2006.01) | |
| *B32B 27/28* | (2006.01) | |
| *B29C 48/30* | (2019.01) | |
| *B29C 48/08* | (2019.01) | |
| *B29C 48/21* | (2019.01) | |
| *B29C 48/305* | (2019.01) | |
| *B29K 21/00* | (2006.01) | |
| *B29K 67/00* | (2006.01) | |
| *B29K 69/00* | (2006.01) | |
| *B29K 105/00* | (2006.01) | |
| *B29L 17/00* | (2006.01) | |
| *B29C 48/15* | (2019.01) | |
| *B29C 48/49* | (2019.01) | |

(52) U.S. Cl.
CPC ............. *B29C 48/307* (2019.02); *B29D 7/01* (2013.01); *B32B 7/02* (2013.01); *B32B 7/10* (2013.01); *B32B 27/08* (2013.01); *B32B 27/18* (2013.01); *B32B 27/285* (2013.01); *B32B 27/36* (2013.01); *B32B 27/365* (2013.01); *B32B 27/40* (2013.01); *B42D 25/00* (2014.10); *B42D 25/45* (2014.10); *B29C 48/15* (2019.02); *B29C 48/49* (2019.02); *B29K 2021/003* (2013.01); *B29K 2067/00* (2013.01); *B29K 2067/003* (2013.01); *B29K 2069/00* (2013.01); *B29K 2105/0026* (2013.01); *B29K 2105/0032* (2013.01); *B29K 2105/0044* (2013.01); *B29K 2995/0025* (2013.01); *B29K 2995/0026* (2013.01); *B29L 2017/00* (2013.01); *B32B 2264/10* (2013.01); *B32B 2264/102* (2013.01); *B32B 2264/108* (2013.01); *B32B 2270/00* (2013.01); *B32B 2274/00* (2013.01); *B32B 2307/41* (2013.01); *B32B 2307/412* (2013.01); *B32B 2307/50* (2013.01); *B32B 2307/514* (2013.01); *B32B 2307/536* (2013.01); *B32B 2307/54* (2013.01); *B32B 2307/546* (2013.01); *B32B 2307/714* (2013.01); *B32B 2307/7145* (2013.01); *B32B 2307/732* (2013.01); *B32B 2307/734* (2013.01); *B32B 2307/75* (2013.01); *B32B 2425/00* (2013.01); *B32B 2429/00* (2013.01); *B42D 2033/30* (2013.01); *B42D 2033/46* (2013.01); *Y10T 428/31507* (2015.04); *Y10T 428/31551* (2015.04); *Y10T 428/31565* (2015.04)

(56) References Cited

U.S. PATENT DOCUMENTS

| | | | |
|---|---|---|---|
| 5,055,345 A | 10/1991 | Wank et al. | |
| 5,089,318 A * | 2/1992 | Shetty | B32B 7/02 428/212 |
| 5,376,430 A | 12/1994 | Swenson et al. | |
| 2002/0130186 A1* | 9/2002 | Lasch | B32B 37/10 235/488 |
| 2002/0146549 A1* | 10/2002 | Kranenburg-Van Dijk | B32B 27/36 428/217 |
| 2003/0134126 A1* | 7/2003 | Hamulski | B29C 55/023 428/423.1 |
| 2004/0007324 A1 | 1/2004 | Henn et al. | |
| 2005/0142371 A1 | 6/2005 | Swain et al. | |
| 2007/0218223 A1* | 9/2007 | Brennan | B32B 27/20 428/32.24 |
| 2010/0021740 A1* | 1/2010 | Tanaka | B32B 9/02 428/412 |
| 2011/0114731 A1 | 5/2011 | Riedl | |
| 2012/0237773 A1 | 9/2012 | Riedl et al. | |

FOREIGN PATENT DOCUMENTS

| | | |
|---|---|---|
| DE | 2236903 A1 | 3/1974 |
| DE | 19614091 A1 | 10/1997 |
| DE | 102009054338 A1 | 5/2011 |
| EP | 0384252 A2 | 8/1990 |
| EP | 0384282 A1 | 8/1990 |
| EP | 0430282 A2 | 11/1990 |
| EP | 0800916 A2 | 10/1997 |
| EP | 2504146 A2 | 10/2012 |
| JP | 2000246858 A | 9/2000 |
| JP | 2005054179 A | 3/2005 |
| WO | 97/37849 A1 | 10/1997 |
| WO | 98/34783 A1 | 8/1998 |
| WO | 0185451 A1 | 11/2001 |
| WO | 2005110773 A1 | 11/2005 |
| WO | 2011063949 A2 | 6/2011 |

OTHER PUBLICATIONS

International Search Report from PCT Application No. PCT/EP2011/000881, dated May 24, 2011.
International Preliminary Report on Patentability and Written Opinion from PCT Application No. PCT/EP2011/000881, dated Aug. 28, 2012.
Kipphan, Helmut, "Handbuch der Printmedien", Springer-Verlag Berlin Heidelberg Germany, 2000, 4 pages.
Lenk, Richard, et al., "Physik abc BAND2 Ma-Z", VEB F.A. Brockhaus Verlag Leipzig, German Democratic Republic (DDR), 1989, 4 pages.
Falbe, Jurgen, et al., ROMPP "Lexikon Chemie M-Pk", Georg Thieme Verlag Rudigerstrabe, Stuttgart, Germany, 1998, 3 pages.
Falbe, Jurgen, et al., ROMPP "Lexikon Chemie T-Z", Georg Thieme Verlag Rudigerstrabe, Stuttgart, Germany, 1999, 3 pages.
"A Guide to Thermoplastic Polyurethanes (TPU)," Elastomers, Huntsman, 2010, 26 Pages.
Falbe et al., "Rompp Chemie Lexikon," Georg Thieme Verlag Stuttgart, 1992, 4 Pages.
"Polyurethane I," retrieved from http://www.chemgapedia.de/vsengine/vlu/vsc/de/9/mac/stufen/polyurethane/polyurein.vlu.html on Jan. 20, 2017, 16 Pages.
Tiggermann et al., "Alternative Zu PVC," Plastic Worker, No. 10, 2004, pp. 182-184.
"Thermoplastische Polyurethan Elastomere (TPU) Elastollan—Materialeigenschaften," BASF The Chemical Company, Nov. 2011, 44 pages.
"Thermoplastische Polyurethan Elastomere (TPU) Elastollan—Sortimentsubersicht," BASF The Chemical Company, May 2012, 28 Pages.
"Thermoplastische Polyurethan Elastomere (TPU) Elastollan—Verarbeitungshinweise," BASF The Chemical Company, Nov. 2011, 28 Pages.

* cited by examiner

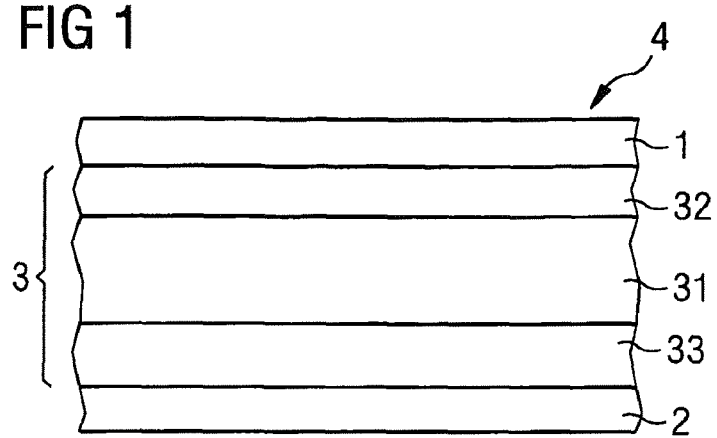
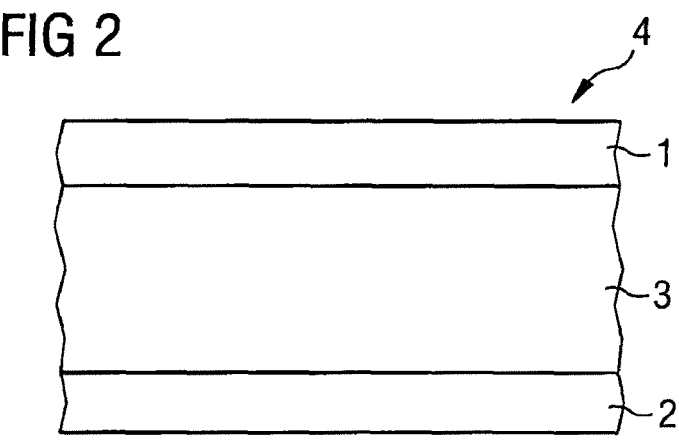
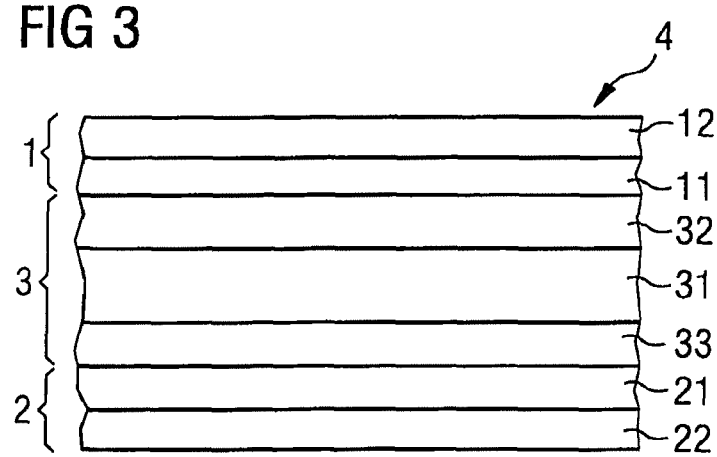

HIGHLY FLEXIBLE FOIL COMPOSITE MATERIAL AND ITS USE IN CARD BODIES

BACKGROUND OF THE INVENTION

A. Field of the Invention

This invention relates to a foil composite material, to a method for manufacturing the foil composite material, as well as to a card body, in particular a card body for a portable data carrier, which contains the foil composite material, and to a method for manufacturing the card body.

B. Related Art

In the production of card bodies, in particular for portable data carriers, such as e.g. chip cards, several plastic foils lying one over the other are laminated to each other. As plastic foils there are usually employed thermoplastic foils because of their good laminatability, e.g. foils made of polyvinyl chloride, polycarbonate, polypropylene, polyethylene terephthalate or thermoplastic polyurethanes. A disadvantage of card bodies made of such thermoplastic foils is their deficient mechanical properties with regard to bending stress and the action of impact force. There result stresses in the card body, and finally cracks. The installation of electronic modules also usually leads to stresses, a weakening of the card body, and ultimately to an elevated susceptibility to cracks and breaks.

To improve the mechanical properties of such card bodies it is advantageous to employ foils made of thermoplastic elastomer, for example based on urethane, within the framework of the laminating process. These foils are exceptionally elastic and can considerably improve the bending strength and breaking strength of the card construction. In the print EP 0 430 282 A2 there is described a card body in the form of a multilayer identification card wherein a layer of thermoplastic elastomer is respectively provided between the card core and corresponding cover foils.

However, it is very difficult to process foils made of thermoplastic elastomer, so-called TPE foils, within the framework of a laminating process upon the manufacture of a card body. On account of their high elasticity the foils are very "limp". The lack of stiffness leads to problems upon processing in the production machines, and the low dimensional stability can also cause register problems upon printing of the foils. In addition, the material tends to flow out upon laminating. Further, such foils possess a low glass transition range, which lies under 0° C., whereby it remains flexible and does not become brittle in this temperature range. Furthermore, the foils tend to block upon stacking on account of their smooth surfaces, so that the foils in a stack are hard to single and transport. To obtain a sufficient connection stiffness upon lamination of such foils to other materials such as polycarbonate, polyethylene terephthalate, polyethylene terephthalate copolyesters or blends of polyesters and polycarbonate, it is moreover necessary to reach the glass point of the respective other material. Because this glass point regularly lies far above the glass transition range of thermoplastic elastomers, this frequently leads to the thermoplastic elastomer floating off, in connection with the dependence on the strength of the viscosity drop in the corresponding temperature range. This has the consequence that the employed laminating machines must often be cleaned. In some cases the foils adjacent to the thermoplastic elastomer can even likewise start to flow, and deform a printed image located thereon. Although it is possible to laminate at lower temperatures to thereby prevent the foils from floating off, an insufficiently good laminate bond is normally obtained upon laminating at low temperatures.

These problems already occur when employing the foil thicknesses of 100 µm to 300 µm that are usual in the manufacture of data carriers. To appreciably protect a data carrier against the risk of breakage, however, it is usually already sufficient to incorporate into the construction on both sides, as far outwardly as possible, layers made of thermoplastic elastomer that are only approximately 30 µm to 50 µm thick. However, these thicknesses are difficult to handle in conventional processing operations. Even very stiff foils such as polycarbonate foils can no longer be processed at layer thicknesses of 50 µm or therebelow.

Hence, it is desirable to combine the positive properties of relatively stiff thermoplastic foils and of foils made of thermoplastic elastomer in a single foil material. A solution approach in this direction is disclosed in the document EP 0 384 252 B 1. The therein described foil composite material has a multiplicity of layers, whereby a middle layer is made of thermoplastic elastomer. This layer is adjoined by layers made of thermoplastic plastics. Upon the manufacture of the composite there are applied to a foil forming the middle layer the further layers. One application method is simultaneous extrusion.

SUMMARY OF THE INVENTION

An object of the present invention is to provide a highly flexible foil material that is suitable for use as a layer in a card body. In particular, the foil material should be readily processable within the framework of producing a card body, and guarantee good mechanical properties of the card body. Desired properties of such a foil material are high flexibility in order to guarantee the desired bending strength, in particular dynamic bending strength, of the card;

the capability to avoid stresses, cracks and breaks in the card, in particular also upon installation of electronic modules into the card;

good laminatability to common card materials, in particular thermoplastic foils, preferably without auxiliary layers;

good printability, preferably without pretreatment for printing;

good dimensional stability upon manufacture and processing;

simple, and preferably inexpensive, manufacturability;

good handling upon further processing, in particular avoidance of blocking, and unproblematic integratability into the conventional process of data-carrier manufacture.

Another object of the present invention is to provide a card body, in particular a card body for a portable data carrier, that avoids the disadvantages of the prior art. In particular, the card body should readily tolerate the installation of electronic modules and have good resistance to stress cracks and breaks, for example upon bending stress and the action of impact force.

According to the invention there is provided a foil composite material having at least three, preferably five, and optionally more than five, layers, i.e. at least one inner layer and one first and one second outer layer which cover the inner layer on both its surfaces. The layers respectively consist of a plastic material, i.e. of plastic that is optionally mixed with usual additives. The plastic of the first and the second outside layer is respectively a thermoplastic polymer or a mixture of thermoplastic polymers. The plastic of the at least one inner layer is a mixture of at least one thermoplastic elastomer and at least one thermoplastic polymer.

Such a foil composite material combines the advantageous elasticity properties of the elastomer with the advantageous properties of the thermoplastic, for example with regard to laminatability and handling. The manufacture of such a composite material raises technical problems, because the usable materials must be carefully coordinated with each other to achieve the desired foil properties. An important role is also played by the choice of the respective layer thicknesses, of the suitable process parameters and extruder configurations, and the suitable composition of the formulations.

The inner plastic layer of the foil composite material preferably consists of more than one layer, particularly preferably of three partial layers, an interior inner plastic layer and two exterior inner plastic layers. The reason for this construction comprising several partial layers is primarily that the optimal extrusion temperatures and melt viscosities of thermoplastics and thermoplastic elastomers are relatively far apart. Hence, an extrusion of a foil composite material having an inner layer made of at least one thermoplastic elastomer and outer layers made of at least one thermoplastic is technically very difficult and typically fails to yield good and reproducible foil qualities. According to the invention, the melt viscosities and extrusion temperatures of the materials forming the individual layers are gradationally approximated to each other by compoundings. This makes it possible for extruders that extrude the respective neighboring layers of the foil composite material being manufactured to be operated with similar or gradationally approximated process parameters, which in turn results in a better, more homogeneous superimposition of the melt layers and an improved mutual adhesive strength of the layers.

The two outer plastic layers can be identical or different. Typically, the outer plastic layers of the foil composite material consist of the same materials and have the same thickness, i.e. the foil composite material is symmetrical with regard to its outer layers. This is not necessary, however, i.e. the outer layers can differ with regard to their plastics, as well as with regard to their thicknesses, as well as with regard to any additives.

The inner plastic layer consists of a mixture of at least one thermoplastic elastomer and at least one thermoplastic, whereby, in order to achieve a suitable gradation of the properties of neighboring layers, the thermoplastic is preferably the same thermoplastic that was used in the neighboring outer layer. At least in the case of only a single inner plastic layer it is hence very advantageous to respectively use the same thermoplastic material for both outer plastic layers.

When the inner plastic layer of the foil composite material is constructed from several partial layers, each of the partial layers respectively contains a mixture of at least one thermoplastic elastomer and at least one thermoplastic, whereby the proportion of the thermoplastic elastomer is higher, the further inward in the foil composite material the respective partial layer lies. For the purposes of achieving good foil qualities and a good mutual adhesive strength of the layers it is preferred to use the same thermoplastic elastomer or mixture of thermoplastic elastomers for all partial layers of the inner layer. It is equally preferred to use the same thermoplastic polymer or mixture of thermoplastic polymers for all partial layers of the inner layer. If the first outer plastic layer and the second outer plastic layer contain different thermoplastic polymers, it is preferred to perform a stepwise approximation of the composition inwardly. For a foil composite material having an inner layer made of three partial layers, this would mean that the first exterior inner plastic layer preferably contains the same thermoplastic as the first outer plastic layer, and the second exterior inner plastic layer preferably contains the same thermoplastic as the second outer plastic layer. The interior inner plastic layer would then preferably contain the thermoplastic of the first outer plastic layer as well as the thermoplastic of the second outer plastic layer.

Although the partial layers of an inner plastic layer preferably have the same types of thermoplastic elastomer and thermoplastic, they can readily differ with regard to their thicknesses and their accessory agents. In an inner layer comprising three partial layers, the innermost layer is preferably the thickest partial layer. Typically, the foil composite material is symmetrical with regard to its inner layers. Such materials can be manufactured most easily.

The thermoplastic elastomers and thermoplastics must be compatible with each other and readily intermiscible. Moreover, their extrusion temperatures and melt viscosities should be as similar as possible. As a plastic for the outer layers it is preferred to use polyester (preferably PETG), polycarbonate or blends of polyester and polycarbonate. As a thermoplastic elastomer for the inner layer or inner layers, thermoplastic urethane elastomers, in particular thermoplastic urethane elastomers based on aromatic esters or ethers, are preferred. Although aliphatic thermoplastic elastomers based on urethane have the advantage of being UV-stable, they can hardly be processed by coextrusion with the preferred thermoplastics. Reproducible foil qualities can only be obtained with difficulty. Although the aromatic types have the disadvantage of low UV stability, this disadvantage can easily be remedied by the addition of UV stabilizers, as are commercially available. For gradational approximation of the properties, each inner layer has an admixture of a thermoplastic, preferably of the thermoplastic of the bordering outer layer.

There are thermoplastic elastomers with different Shore D hardnesses, whereby the respective hardness should be coordinated with the thermoplastic of the bordering or nearest outer layer. When the thermoplastics are polyesters, there is preferably used as a thermoplastic elastomer a thermoplastic elastomer with a Shore D hardness of 35 to 50, and when the thermoplastic is a polycarbonate, there is preferably used as an elastomer an elastomer with a Shore D hardness in the range of 40 to 70, in particular between 50 and 65. Further, the thermoplastic elastomers should have as many as possible of the following properties: they should have an elongation at break between 300% and 700%, in particular between 350% and 500%; they should possess a melt viscosity in dependence on the melt temperature, and preferably have an MFI of 7 to 11 $cm^3/10$ min; their processing temperatures should lie between 190° C. and 240° C., in particular between 210° C. and 240° C.; they should be resistant to hydrolysis; they should possess an affinity for the thermoplastics used for the outer layers, in particular for polyesters and/or polycarbonates.

The foil composite material according to the invention can be manufactured in transparent, colored or colorless, and opaque embodiments. Opaque embodiments contain besides the plastic components, and optionally other additives, fillers such as for example titanium dioxide (white) and carbon black (black). Colored pigments such as various metal oxides can also be contained. For example, opaque embodiments contain $TiO_2BaSO_4$ as a filler as a white pigment. In particular in stretched foils, the opacity can also be produced by voids.

When the foil composite material is used as an outer layer of a card body, it is preferably transparent. Preferred plastic compositions (without consideration of additives) for a five-layered transparent foil composite material are respectively 0% thermoplastic elastomer and 100% thermoplastic for the first and the second outer layer, respectively 20% to 50% thermoplastic elastomer and 80% to 50% thermoplastic for the first and the second exterior inner layer, and 30% to 70%, preferably 50% to 70%, thermoplastic elastomer and 70% to 30%, preferably 50% to 30%, thermoplastic for the interior inner layer.

When the foil composite material according to the invention is used in the interior of a card construction, it is preferably opaque. Preferred compositions (with consideration of plastics and fillers) for a five-layered opaque foil composite material are: respectively 0% elastomer, 85% to 95% thermoplastic and 5% to 15% filler for the first and the second outer layer; respectively 20% to 50% elastomer, 75% to 35% thermoplastic and 5% to 15% filler for the first and the second exterior inner layer, and 50% to 70% thermoplastic elastomer, 45% to 15% thermoplastic and 5% to 15% filler for the interior inner layer.

These figures are in percent by weight, no consideration being taken of any additives such as UV stabilizers, dyes, laser additives, etc.

The foil composite material according to the invention can also have more than three partial layers made of elastomer/thermoplastic mixtures. Independently of the exact composition and the kind of thermoplastics and elastomers used, it is always essential that the content of thermoplastic elastomer in an interior partial layer is at least as high as, and preferably higher than, the content of thermoplastic elastomer in the bordering exterior partial layer.

Besides the plastics themselves, the materials for the individual layers can contain common additives, for example the above-mentioned fillers and UV stabilizers, or also color pigments, flame retardants, optical brighteners, oxidation stabilizers and laser additives. The admixture of auxiliary agents is preferably kept low so as to interfere with the mutual coordination of the plastic materials as little as possible. The respective outer layers of the foil composite material can also contain an admixture of antiblocking agents.

The total thickness of the foil composite material according to the invention typically lies between 50 µm and 350 µm, whereby the thickness varies, depending on the place in the layer sequence of a card body where the foil composite material is to be provided. When the foil composite material is used as an interior layer, i.e. as a part of the core layer construction, total layer thicknesses in the range of about 150 µm to 350 µm, for example 240 µm, are preferred. When the foil composite material is used as a cover layer, total layer thicknesses in the range of about 80 µm to 130 µm, for example 105 µm, are preferred. Referring to the total layer thickness as 100%, about 10% to 30% respectively falls on the first and the second outer plastic layer here, and accordingly about 80% to 40% on the inner plastic layer. A particularly preferred layer thickness distribution is, with a deviation of respectively about ±3%, 10% respectively for the first and the second outer plastic layer, 20% respectively for the first and the second exterior inner plastic layer, and 40% for the interior inner plastic layer.

The manufacture of the foil composite material according to the invention is effected by coextrusion. In so doing, the plastic materials provided for the individual layers of the foil composite material according to the invention are respectively melted in suitable extruders, optionally with the admixture of the corresponding additives, and the melt is supplied to a feedblock or a wide slot nozzle. The foil materials are so merged in the feedblock or wide slot nozzle prior to discharge that the layer sequence of the hereinabove described foil composite material arises. Upon manufacture, attention should be paid in particular to the following:

The thermoplastic elastomers, in particular the preferred thermoplastic elastomers based on urethane, are hygroscopic. Hence, the elastomers must be predried well prior to processing, i.e. the residual moisture should be less than 0.05%, because otherwise a degradation through hydrolysis can occur during the processing operation in the extruder.

The thermoplastic elastomers are thermally degraded at elevated temperatures. Hence, their residence time in the extruders must be kept as short as possible, i.e. a continuous feed of the melt without interruption be ensured.

The foil composite materials must contain a minimum total amount of thermoplastic elastomer in order for the foil to possess a sufficient elasticity to be able to compensate the occurring stresses and mechanical loads in the structure of a card body later. Typically, about 40% thermoplastic elastomer is required, but the value can be lower or higher depending on the card construction and the thermoplastic elastomer. It is necessary to provide extruder configurations that are able to feed the corresponding layer thicknesses continuously. Normally, it is advantageous to make the layer thicknesses of the layers with thermoplastic elastomer as large as possible, and to make the proportion of thermoplastic elastomer in the respective layers likewise as large as possible.

Thermoplastics and thermoplastic elastomers (in particular the preferred thermoplastic polyesters and thermoplastic elastomers based on urethane) have optimal extrusion temperatures and melt viscosities that are relatively far apart. Hence, the formulations must be so adjusted that the extrusion temperatures and the melt viscosities of neighboring layers are approximated by the compoundings of thermoplastics and thermoplastic elastomers, so that a homogeneous superimposition of the melt layers is guaranteed. Exemplary formulations were already stated hereinabove. Exemplary processing parameters are stated for FIG. 1.

For a five-layered foil composite material, the extrusion (temperature of the extrusion nozzle or the melt temperatures of the individual molten streams) of the first and the second outer plastic layer is preferably effected at 200 to 280° C., particularly preferably at 210 to 260° C., the extrusion of the first and the second exterior inner plastic layer preferably at a temperature of 200 to 270° C., particularly preferably at 210 to 260° C., and the extrusion of the interior inner plastic layer preferably at 190 to 270° C., particularly preferably at 220 to 250° C.

In the foil composite material according to the invention, excellent bond values of the layers with each other are obtained, i.e. the mutual adhesive strength of the layers typically amounts to at least 30 N/cm.

The foil composite material according to the invention is in particular suitable for being used as a layer in the layer construction of a card body in order to improve the mechanical properties of the card body.

Card bodies, in particular card bodies for chip cards and other data carriers, typically consist of a multiplicity of layers which are interconnected by laminating. The individual layers usually consist of thermoplastic polymeric materials, such as polyvinyl chloride, polycarbonate or polyethylene terephthalate. Between the layers or in recesses of the layers there can be located electronic components and imprinted antennas. As at least one of the layers of the card body here there is used a foil composite material according to the invention. In particular, the foil composite material according to the invention is used as one or as both cover layers (overlay foil) of the card body. Alternatively or additionally, the foil composite material according to the invention can be provided within the card construction (inlay foil), i.e. form a core layer.

For manufacturing the card body, the plastic foils that are to form the later card body are laminated to each other. Laminating can be effected in a single operation, i.e. all foil materials that are to form the card body are stacked and laminated in one operation. Alternatively, laminating can be carried out in two or more operations, that is, only a portion of the foils is respectively laminated jointly into a partial stack, and the partial stacks are then stacked and laminated into the card body in a further operation later. A good laminate bond is obtained here by laminating at a temperature between 120° C. and 200° C., in particular between 130° C. and 180° C., preferably between 140° C. and 160° C.

Preferably, laminating is carried out in a heating station and a cooling station, whereby the pressure in the heating station and the pressure in the cooling station are chosen suitably. The laminating time preferably lies respectively between 10 minutes and 25 minutes in the heating and/or cooling station.

The card bodies according to the invention typically have total thicknesses in the range of about 0.5 to 1.0 mm. The total thickness of the foil composite material according to the invention normally lies between 80 µm and 350 µm, depending on the place in the layered composite of the card body where the foil composite material is to be used. Inlay foils are usually thicker than overlay foils, whereby the total thickness for inlay foils typically lies in the range of 150 µm to 350 µm, and the total thickness for overlay foils typically lies in the range of 80 µm to 130 µm. The foil composite materials according to the invention, due to their outer layers made of thermoplastic plastic, fuse very well with neighboring layers of the card-body layer construction, so that a stable card-body laminate bond is obtained. Simultaneously, the outer layers made of thermoplastic ensure, when the foil composite material according to the invention is used as an overlay foil or when for example a foil according to the invention is used as a core foil, that the card bodies can be printed and handled without any problems, and do not tend to block.

DESCRIPTION OF THE DRAWINGS

The invention will hereinafter be illustrated further on the basis of figures. It is pointed out that the figures are not true to proportion and not true to scale. Moreover, it is pointed out that the figures are only intended to explain the invention more closely and are by no means to be understood as restrictive. Identical reference numbers designate identical elements.

There are shown:

FIG. 1 a section through a foil composite material according to the invention having an inner plastic layer which consists of an interior inner layer and two exterior inner layers, a first outer plastic layer and a second outer plastic layer, FIG. 2 a section through a foil composite material according to the invention having an inner plastic layer, a first outer plastic layer and a second outer plastic layer, FIG. 3 a section through a foil composite material according to the invention having an inner plastic layer which consists of an interior inner layer and two exterior inner layers, as well as having two first outer plastic layers and two second outer plastic layers, FIG. 4 a section through a card body according to the invention having two foil composite materials according to the invention as cover layers and having a chip module, FIG. 5 a section through a card body according to the invention having two foil composite materials according to the invention as partial layers of the card core and having a chip module, and FIG. 6 a section through a card body according to the invention having two foil composite materials according to the invention as cover layers, as well as two foil composite materials according to the invention as partial layers of the card core, and having a chip module.

DETAILED DESCRIPTION OF PREFERRED EMBODIMENTS

Figure 4:
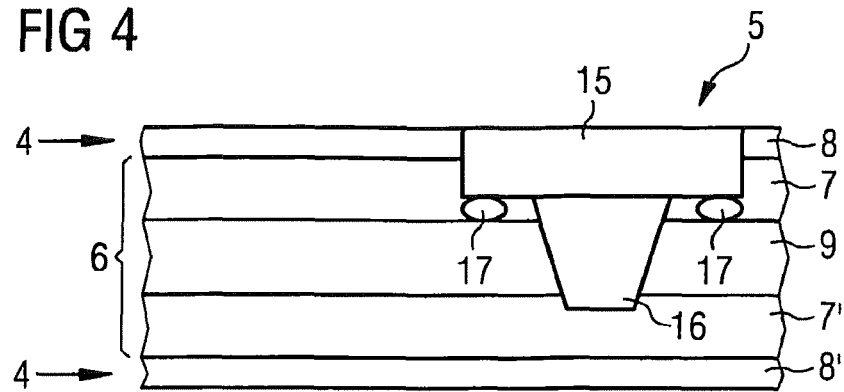

FIG. 1 shows a first embodiment of a foil composite material 4 according to the invention in cross section. In this embodiment, the inner plastic layer consists of an interior partial layer 31, a first exterior partial layer 32 and a second exterior partial layer 33. Located thereon are a first outer plastic layer 1 and a second outer plastic layer 2. These outer plastic layers contain as the plastic component (besides any additives that might be present) a thermoplastic polymer or a mixture of thermoplastic polymers. The inner layers 31, 32, 33 contain as the plastic component (besides any additives that might be present) respectively a mixture of at least one thermoplastic elastomer and at least one thermoplastic polymer. The interior inner layer 31 has a higher content of thermoplastic elastomer than the exterior inner layers 32, 33. In the inner layer 3 or the partial layers 31, 32, 33 there is used the same thermoplastic polymer or mixture of thermoplastic polymers as in the outer layers 1, 2. Through the gradation in the compositions of the layers from pure thermoplastic on the outside to a mixture with a high elastomer content in the innermost layer, respective neighboring layers are relatively similar to each other or approximated to each other, and upon extrusion there can be obtained a homogeneous superimposition of the melt layers and a good mutual adhesion of the individual partial layers.

The manufacture of the foil composite material 4 can be effected for example by melting granules with three different compositions or compoundings (granules A for the first and the second outer plastic layer 1, 2; granules B for the first and the second exterior inner plastic layer 32, 33; granules C for the interior inner plastic layer 31) in three extruders A, B, C, and respectively extruding the corresponding molten streams (material A from extruder A, material B from extruder B, material C from extruder C) through a wide slot nozzle and merging them into the represented layer construction. Alternatively, it is possible to merge the layers in the feedblock prior to extruding through the wide slot nozzle. Further, there is the alternative possibility of merging the layers only in the wide slot nozzle, a so-called multi-channel nozzle, itself, prior to the melt discharge. In the represented embodiment, the foil composite material is symmetrical in construction, i.e. the outer layers 1, 2 and the partial layers of the inner layer 32, 33 respectively have the same composition and the same thickness. This is not necessary, however. In the case of asymmetrical foil composite materials, a corresponding greater number of extruders and a different corresponding feedblock constellation are required for manufacture.

Hereinafter there will be stated some concrete exemplary formulations for a transparent foil composite material and an opaque foil composite material.

Transparent foil, material thickness 105 to 110 μm, layer thickness ratio 1/32/31/33/2=10/20/40/20/10:

Layers 1, 2: 4% S462+4% S465+92% PETG

Layers 32, 33: 4% S465+32% 9665 DU+64% PETG

Layer 31: 4% S465+65% 9665 DU+31% PETG

Opaque foil, material thickness 120 μm, layer thickness ratio 1/32/31/33/2=10/20/40/20/10:

Layers 1, 2: 20% S469-YE+80% PETG

Layers 32, 33: 55% PETG+25% DP 9665 DU+20% S469-YE

Layer 31: 30% PETG+50% DP 9665 DU+20% S469-YE

Desmopan 9665 DU, from the company Bayer Material Science, is a thermoplastic elastomer based on urethane (ether type) with a Shore D hardness of 75 (Shore A hardness 98) and an elongation at break of 350% (foil M5e). It is UV-stabilized, resistant to microbes and to hydrolysis.

S469-YE from the company Sukano is a white additive.

S462 from the company Sukano is an antiblocking agent.

S465 from the company Sukano is a laser additive.

Hereinafter there will be stated some exemplary extruder settings for manufacturing the foil composite material 4.

Processing Parameters:

| Preferred processing temperatures Extruder C | | | | |
|---|---|---|---|---|
| Zone 1 | Zone 2 | Zones 3 to n | Melt pipes, pump, filter | Feedblock/ Nozzle |
| 30° C.- 80° C. | 180° C.- 270° C. | 190° C.- 270° C. | 190° C.- 270° C. | 190° C.- 270° C. |

| Particularly preferred processing temperatures Extruder C | | | | |
|---|---|---|---|---|
| Zone 1 | Zone 2 | Zones 3 to n | Melt pipes, pump, filter | Feedblock/ Nozzle |
| 40° C.- 70° C. | 200° C.- 250° C. | 210° C.- 250° C. | 210° C.- 250° C. | 220° C.- 250° C. |

| Preferred processing temperatures Extruder B | | | | |
|---|---|---|---|---|
| Zone 1 | Zone 2 | Zones 3 to n | Melt pipes, pump, filter | Feedblock/ Nozzle |
| 30° C.- 70° C. | 190° C.- 270° C. | 200° C.- 270° C. | 200° C.- 270° C. | 200° C.- 270° C. |

| Particularly preferred processing temperatures Extruder B | | | | |
|---|---|---|---|---|
| Zone 1 | Zone 2 | Zones 3 to n | Melt pipes, pump, filter | Feedblock/ Nozzle |
| 40° C.- 60° C. | 200° C.- 260° C. | 210° C.- 260° C. | 210° C.- 260° C. | 210° C.- 260° C. |

| Preferred processing temperatures Extruder A | | | | |
|---|---|---|---|---|
| Zone 1 | Zone 2 | Zones 3 to n | Melt pipes, pump, filter | Feedblock/ Nozzle |
| 30° C.- 70° C. | 200° C.- 280° C. | 200° C.- 280° C. | 200° C.- 280° C. | 200° C.- 280° C. |

| Particularly preferred processing temperatures Extruder A | | | | |
|---|---|---|---|---|
| Zone 1 | Zone 2 | Zones 3 to n | Melt pipes, pump, filter | Feedblock/ Nozzle |
| 40° C.- 60° C. | 210° C.- 260° C. | 210° C.- 260° C. | 210° C.- 260° C. | 210° C.- 260° C. |

The respective favorable extruder settings can vary in dependence on the extruders used (throughput, screw geometries). They provide information for orientation, which a person skilled in the art can optionally adapt to the given extruder configurations by a few routine tests.

FIG. 2 shows another embodiment of the foil composite material 4 according to the invention. This embodiment has the simplest layer construction with a single inner layer 3 and two outer layers 1, 2. The outer layers 1, 2 consist in turn of a thermoplastic polymer or a mixture of thermoplastic polymers. As in all embodiments, polyester, polyester mixtures, in particular PETG, polycarbonate, polycarbonate mixtures and blends of polyester and polycarbonate are preferred thermoplastic polymers. The inner layer 3 consists of a mixture of at least one thermoplastic elastomer, preferably an elastomer based on urethane, with a proportion of thermoplastic polymer. The thermoplastic polymer used for the inner layer 3 is identical with the thermoplastic polymer or polymer mixture that is used for the outer layers 1, 2. For all embodiments of the foil composite material according to the invention, urethane elastomers based on aromatic esters or aromatic ethers are particularly preferred because of their special suitability for coextrusion with thermoplastics. They are very particularly preferred for an only three-layered foil composite material as represented in FIG. 2, because there are fewer possibilities for gradation with only a single inner layer than for example with a three-layered inner layer as represented in FIG. 1. Hence, it is more difficult to create compatible transitions between the individual layers.

FIG. 3 shows a further embodiment of the foil composite material 4 according to the invention wherein the inner layer 3 is constructed as in the foil composite material represented in FIG. 1, but the first outer layer 1 and the second outer layer 2 are respectively constructed from an exterior outer layer 12, 22 and an interior outer layer 11, 21. The foil composite material thus has altogether seven layers. As a general rule, the manufacture of the foil composite material is the more difficult the more layers the foil composite material has. Hence, variants with outer layers 1, 2 that are constructed from several partial layers are less preferred. They are expedient primarily when there is to be incorporated into an exterior partial layer 12, 22 a constituent that is incompatible with a constituent of the inner layer 3, or when for example a separate partial layer is to be equipped with an antiblocking agent. The corresponding admixtures are then present only in the exterior first outer layer 12 and/or the exterior second outer layer 22.

Figure 5:
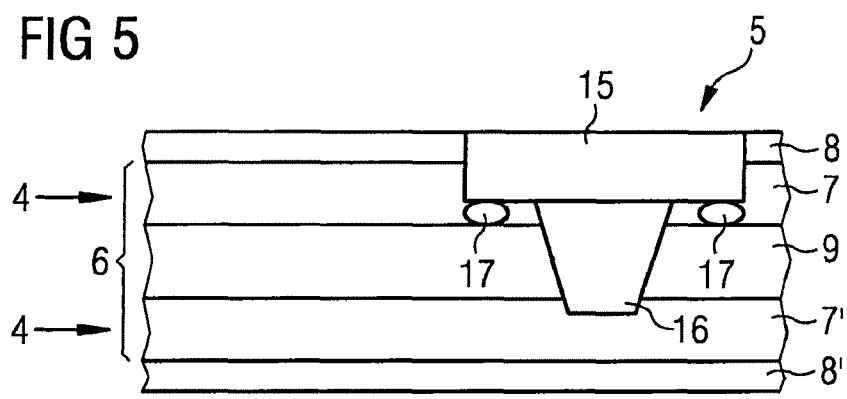
Figure 6:
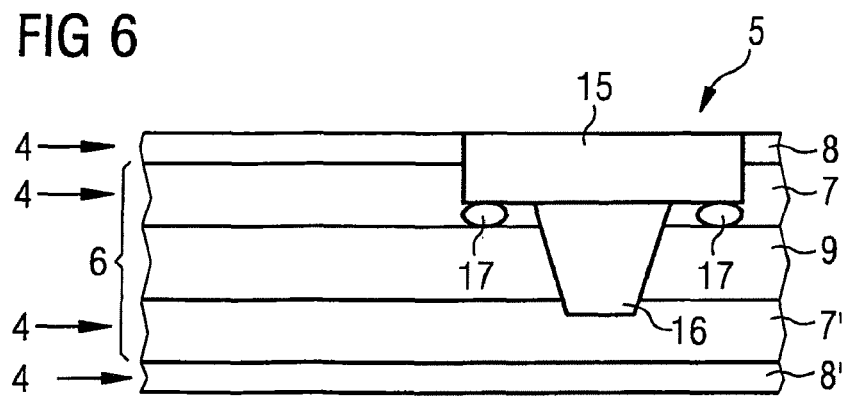

FIGS. 4, 5 and 6 respectively show exemplary layer constructions for card bodies 5 according to the invention. In general, card bodies according to the invention consist of a card core 6 which is typically constructed from one to seven layers. In the figures there are respectively represented three core layers, an inner core layer 9, a first outer core layer 7 and a second outer core layer 7'. In card bodies of the prior art, the card cores consist of thermoplastic foils, typically made of PVC, PET, ABS, polyester, PC, PEC and the like. Such foils can also be used for card cores according to the invention. Between the foil layers and/or in recesses of the foil layers there can be located electronic components such as electronic modules and antennas. Other features, such as for example security elements or imprints, can also be provided. The layer construction of the card bodies 5 is respectively completed on the outer side by a cover layer 8, 8'. The foils forming the layer construction are preferably interconnected by laminating, which is why all materials used should be readily laminatable to each other.

FIG. 4 shows an embodiment of a card body 5 according to the invention having a card core 6, consisting of a PVC or PET foil 9 onto which a coil (not shown) is imprinted, and two PVC films 7, 7'. The layer construction is completed by the two cover foils 8, 8' which consist of the foil composite material 4 according to the invention, as was described hereinabove.

In recesses of the foils 7, 8 there is located a chip module 15 which is glued to the card body by means of a module pad 16 made of module adhesive. Contacts 17 establish the electrical contact to the coil (not shown) imprinted onto the foil 9.

When the foil composite material 4 according to the invention is used as a cover layer (overlay foil), as represented in FIG. 4, it is preferably transparent. The use of the foil composite material according to the invention exclusively as a cover layer has the advantage that the gluing of the chip module 15 is effected exclusively to standard card foils, so that the usual standard module adhesive can still be used for the module pad 16.

FIG. 5 shows another embodiment of a card body 5 according to the invention. Here the card core 6 consists of a PVC or PET foil 9 with an imprinted antenna coil (not shown) which is adjoined on both sides by the layers 7, 7' made of the foil composite material 4 according to the invention. The layer construction is completed by the two cover layers 8, 8' made of PVC foil. As in the embodiment represented in FIG. 4, a chip module 15 is glued into the card body 5 by means of a module pad 16 and has contacts 17 for contacting the antenna coil.

When the foil composite material 4 according to the invention forms a partial layer or partial layers of the core 6, as in the embodiment represented in FIG. 5, it is preferably of opaque design. This embodiment has the advantage that the foil composite material according to the invention, because it is located in the gluing region of the chip module, can especially well compensate stresses that are built up in the material through the action of temperature (hot-melt gluing) upon implanting of the module.

A further alternative embodiment of a card body 5 according to the invention is represented in FIG. 6. Here, the card core 6 consists of the inner core layer 9 made of PVC or PET foil, the first outer core layer 7 and the second outer core layer 7', both made of foil composite material 4 according to the invention in opaque design. The two cover layers 8, 8' likewise consist of foil composite material 4 according to the invention, this time in transparent design. A chip module 15 is implanted into the card body and glued as in the embodiments of FIG. 4 and FIG. 5. This embodiment with foil composite material 4 according to the invention both as a partial core layer and as a cover layer gives the card body 5 especially advantageous mechanical properties. On the one hand, stresses built up through the action of temperature upon implanting of the module are compensated well by the partial core layers according to the invention, and, on the other hand, the far outwardly located cover foils 8, 8' made of foil composite material 4 according to the invention ensure a high breaking strength, lack of tendency to block, good printability and stiffness.

In FIGS. 4, 5 and 6, the card constructions are respectively represented symmetrically, but this is not necessary. Embodiments are for example also possible wherein the foil composite material 4 according to the invention is used only as one of the cover layers and/or as a partial core layer. Upon use as a cover layer, the layer thickness of the foil composite material 4 is typically no more than half as great as upon the use as a partial core layer.

Through the employment of the foil composite material according to the invention as a cover layer (or cover layers) and/or as a core layer (or core layers) in a card body, the mechanical properties of card bodies can be decisively improved over card bodies of the prior art. The card bodies can be subjected to stronger and more frequent bending loads without there occurring stresses, cracks or breaks of the card body. Stresses arising from the installation of electronic modules, which always cause a weakening of the card body, can also be compensated and thus the mechanical properties of the card body improved. The foil composite material according to the invention can be employed in the card bodies instead of any standard foil.

In particular card constructions wherein the foil composite material according to the invention is employed in the interior of the card construction, as represented by way of example in FIG. 5, have excellent mechanical properties, such as excellent strength and stiffness. This becomes evident particularly in the case of actions of impact force, which otherwise as a rule lead to card breakage. This is due to the greater thickness of the foil composite material core layers, and thus the higher proportion of the foil composite material according to the invention in the card body altogether.

The foil composite material according to the invention is also very stable in itself, i.e. there is a firm bond between its individual partial layers without any danger of the partial layers separating from each other upon load. This stability is achieved by suitable gradations of the compositions of the partial layers which result in similar processing properties of neighboring partial layers.

The foil composite material according to the invention can be manufactured inexpensively, and there is a wide spectrum of suitable thermoplastic elastomers with different properties available on the market. The foil composite material is easy to process by the coextrusion method and is also characterized by especially simple handling in further processing, i.e. it can for example be printed without any problems and laminated to all common card materials. It also does not tend to block. The foil material can be manufactured with a high proportion of thermoplastic elastomer, which makes it very elastic and, upon use as a layer in a card body, considerably improves the mechanical properties of the card body over card bodies without the foil composite material according to the invention.

The invention claimed is:
1. A method for manufacturing a foil composite material comprising a coextrusion of at least one first outer layer plastic material, at least one second outer layer plastic material, and at least one inner layer plastic material, the method comprising the steps:
  coextruding and merging each of the plastic materials so as to form the foil composite material to include
    an inner plastic layer formed between a first outer plastic layer and a second outer plastic layer,
    the first outer plastic layer being in direct contact with a first surface of the inner plastic layer, and
    the second outer plastic layer being in direct contact with a second surface of the inner plastic layer, the first surface of the inner plastic layer being opposite from the second surface of the inner plastic layer;
  wherein
  the at least one first outer layer plastic material comprises a thermoplastic polymer or a mixture of thermoplastic polymers,
  the at least one second outer layer plastic material comprises a thermoplastic polymer or a mixture of thermoplastic polymers, and
  the at least one inner layer plastic material comprises a mixture of at least one thermoplastic elastomer and at least one thermoplastic polymer, and
  wherein the inner plastic layer includes an interior plastic layer, a first exterior plastic layer, and a second exterior plastic layer, the interior plastic layer being formed between and in contact with each of the first exterior plastic layer and the second exterior plastic layer,
  wherein the foil composite material is opaque, and
  wherein
    each of the first outer plastic layer and the second outer plastic layer are 0% thermoplastic elastomer, 85% to 95% thermoplastic polymer, and 15% to 5% filler
    each of the first exterior plastic layer and the second exterior plastic layer are 20% to 50% thermoplastic elastomer, 75% to 35% thermoplastic polymer, and 5% to 15% filler, and
    the interior plastic layer is 50% to 70% thermoplastic elastomer, 45% to 15% thermoplastic polymer, and 5% to 15% filler.

2. The method according to claim 1, wherein the first outer plastic layer and the second outer plastic layer are extruded at a nozzle temperature of 200 to 280° C., the first exterior plastic layer and the second exterior plastic layer are extruded at a nozzle temperature of 200 to 270° C., and the interior inner plastic layer is extruded at a nozzle temperature of 190 to 270° C.

3. A method for manufacturing a card body configured as a portable data carrier, the method comprising:
  forming a plurality of plastic layers to include a card core and at least two cover layers, the card core being made of at least one inner core layer, the card core being formed between the at least two cover layers, a first cover layer being in direct contact with a first surface of the card core and a second cover layer being in direct contact with a second surface of the card core,
  wherein, in the step of forming the plurality of plastic layers,
    the plastic layers are laminated to each other in one work operation or in several work operations, and
    the card core, the first cover layer, or the second cover layer includes a foil composite material that comprises a coextrusion of at least one first outer layer plastic material, at least one second outer layer plastic material, and at least one inner layer plastic material,
    the foil composite material being formed by
    coextruding and merging the at least one first outer layer plastic material, the at least one second outer layer plastic material, and the at least one inner layer plastic material such that the foil composite material includes
      an inner plastic layer formed between a first outer plastic layer and a second outer plastic layer,
      the first outer plastic layer being in direct contact with a first surface of the inner plastic layer, and
      the second outer plastic layer being in direct contact with a second surface of the inner plastic layer, the first surface of the inner plastic layer being opposite from the second surface of the inner plastic layer,
  wherein the at least one first outer layer plastic material comprises a thermoplastic polymer or a mixture of thermoplastic polymers,
  the at least one second outer layer plastic material comprises a thermoplastic polymer or a mixture of thermoplastic polymers, and
  the at least one inner layer plastic material comprises a mixture of at least one thermoplastic elastomer and at least one thermoplastic polymer,
  wherein the foil composite material is opaque, and
  wherein
    each of the first outer plastic layer and the second outer plastic layer are 0% thermoplastic elastomer, 85% to 95% thermoplastic polymer, and 15% to 5% filler,
    each of the first exterior plastic layer and the second exterior plastic layer are 20% to 50% thermoplastic elastomer, 75% to 35% thermoplastic polymer, and 5% to 15% filler, and
    the interior plastic layer is 50% to 70% thermoplastic elastomer, 45% to 15% thermoplastic polymer, and 5% to 15% filler.

4. The method according to claim 3, wherein the plastic layers are laminated to each other at a temperature of between 120° C. and 200° C.

5. The method according to claim 1, wherein
  the first exterior plastic layer is adjacent to the first outer layer plastic material, the first exterior plastic layer includes a first thermoplastic polymer, and the first thermoplastic polymer of the first exterior plastic layer is the same as the thermoplastic polymer of the first outer layer plastic material, and
  the second exterior plastic layer is adjacent to the second outer layer plastic material, the second exterior plastic layer includes a second thermoplastic polymer, and the second thermoplastic polymer of the second exterior plastic layer is the same as the thermoplastic polymer of the second outer layer plastic material.

6. The method according to claim 1, wherein the interior plastic layer, the first exterior plastic layer, and the second exterior plastic layer include a same thermoplastic elastomer.

7. The method according to claim 5, wherein the first exterior plastic layer includes the first thermoplastic polymer and the second exterior plastic layer includes the second thermoplastic polymer, and the mixture of at least one thermoplastic elastomer and at least one thermoplastic polymer of the interior plastic layer includes the first thermoplastic polymer and the second thermoplastic polymer.

8. The method according to claim 1, wherein
  the interior plastic layer is thicker than the first exterior plastic layer, and
  the interior plastic layer is thicker than the second exterior plastic layer.

9. The method according to claim 1, wherein the inner layer plastic material comprises a first interior plastic layer and a second interior plastic layer, and
the first interior plastic layer is comprised of a first percentage of thermoplastic elastomer, and the second interior plastic layer is comprised of a second percentage of thermoplastic elastomer, and
when the first interior plastic layer is a more interior layer than the second interior plastic layer, the first percentage of thermoplastic elastomer is greater than or equal to the second percentage of thermoplastic elastomer.

10. The method according to claim 1, wherein the foil composite material has a total thickness between 50 μm and 350 μm.

11. The method according to claim 1, wherein the foil composite material has a total thickness between 80 μm and 130 μm.

12. The method according to claim 1, wherein the foil composite material has a total thickness between 150 μm and 350 μm.

13. The method according to claim 1, wherein a total thickness of the first outer layer plastic material is 10% to 30% of a total thickness of the foil composite material, a total thickness of the second outer layer plastic material is 10% to 30% of the total thickness of the foil composite material, and a total thickness of the inner layer plastic material is 80% to 40% of the total thickness of the foil composite material.

14. The method according to claim 1, wherein
a total thickness of the first outer layer plastic material is 10% of a total thickness of the foil composite material,
a total thickness of the second outer layer plastic material is 10% of the total thickness of the foil composite material,
a total thickness of the first exterior plastic layer is 20% of the total thickness of the foil composite material,
a total thickness of the second exterior plastic layer is 20% of the total thickness of the foil composite material, or
a total thickness of the interior plastic layer is 40% of the total thickness of the foil composite material.

15. The method according to claim 1, wherein the interior plastic layer is comprised of a first percentage of thermoplastic elastomer, the first exterior layer is comprised of a second percentage of thermoplastic elastomer, and the second exterior layer is comprised of a third percentage of thermoplastic elastomer, and
the first percentage of thermoplastic elastomer is greater than or equal to the second percentage of thermoplastic elastomer, and
the first percentage of thermoplastic elastomer is greater than or equal to the third percentage of thermoplastic elastomer.

* * * * *